United States Patent [19]

Arnold

[11] 4,146,900

[45] Mar. 27, 1979

[54] PRINTING SYSTEM

[75] Inventor: Gary A. Arnold, Stamford, Conn.

[73] Assignee: St. Regis Paper Company, New York, N.Y.

[21] Appl. No.: 815,172

[22] Filed: Jul. 13, 1977

[51] Int. Cl.$^2$ .............................................. G01D 15/18

[52] U.S. Cl. ........................................ 346/75; 101/35; 346/140 R

[58] Field of Search ............... 346/75, 140 R; 358/77; 101/35

[56] References Cited

U.S. PATENT DOCUMENTS

| | | | |
|---|---|---|---|
| 2,278,940 | 4/1942 | Murphy | 358/77 |
| 3,152,858 | 10/1964 | Wadey | 346/75 |
| 3,553,371 | 1/1971 | Svenaga | 358/77 |
| 3,867,882 | 2/1975 | Ahlgren | 101/35 |

OTHER PUBLICATIONS

Magill et al.; Printer-Recorder, IBM Tech. Disc. Bulletin, vol. 13, No. 9, Feb. 1971, pp. 2703–2704.

*Primary Examiner*—Joseph W. Hartary

*Attorney, Agent, or Firm*—Woodling, Krost, Granger & Rust

[57] ABSTRACT

A printing system is disclosed wherein ink is emitted from a nozzle as entrained in a jet of air. The ink is introduced onto an ink wall from an ink passageway and a fluid passageway has an outlet directing air at an angle onto this ink wall to cause ink to flow along the wall and form into ligaments and eventually part from that wall as droplets. The droplets part from the ink wall primarily at a tip wall which diverges out of the air stream. In a preferred embodiment there are two such ink walls and the two flows of ink droplets converge to form a single stream. A printing head contains a plurality such as seven such nozzles in a row and then relative movement of the printing head and the printing surface together with controlled pulses of the emitted ink will cause alphanumeric characters to be imprinted on the printing surface. This provides a means for direct printing of pertinent label information on the surfaces of production items such as rolls of paper, pulp bales, paper board bundles or other unitized commodities with a suitable exterior surface.

12 Claims, 10 Drawing Figures

PRINTING SYSTEM

BACKGROUND OF THE INVENTION

Printing by a jet of ink has been disclosed in many of the prior art patents, many of which disclose a system for emitting a stream of ink drops and then selectively, electrostatically deflecting these ink drops to form alphanumeric characters. Such systems are suitable for small size characters of about typewriter size characters but have not been found to emit enough ink to create larger size characters, e.g. three to five centimeters in height. Large rolls of paper, for example, being produced by a paper mill, need labeling information somewhere on the exterior surface, which labeling information includes the name of the manufacturer, the type or grade of the paper, the run number, the weight of the roll, the date, addressee, etc. Typically, this information was hand labeled on the exterior or was hand printed on the exterior or was stenciled onto the exterior or onto a label which was then glued to the exterior surface. A presently commercially available mechanical system for printing of bulk items such as rolls of paper utilizes a constant air supply plus selective valving of ink to nozzles and by this means labels are imprinted. The valving of the ink can lead to potentially serious problems of clogging of the valves with dried ink, particulates, etc. Also the speed of production of the label is limited by the viscosity and density of the fluid. In all of these prior attempts, especially the hand labeling, there was always the problem of illegibility of the label information and there was always the problem with the excess manpower requirements.

In the early development phase valving of ink was an attempt to create metered slug flow of ink interspersed with air but the physical constraints of this type of ink flow prohibited the accurate metering and delivery of ink droplets and therefore the printing achieved by this system was not sufficiently legible.

Accordingly the problem to be solved is how to achieve printing of label information on bulk items such as rolls of paper by printing this information directly on an exterior surface of the roll in large letters or numerals, how to accomplish the printing with speed, ease and a minimum of manpower, and without the necessity of adhesively applying labels to the bulk material.

SUMMARY OF THE INVENTION

The invention may be incorporated in a printing head comprising in combination, a base, means on said base defining a fluid passageway, means on said base defining an ink passageway, an outlet from said fluid passageway, an ink wall downstream from said outlet, means for introducing ink onto said ink wall from said ink passageway, said fluid passageway outlet directing fluid at an angle A onto said ink wall to cause the ink on said ink wall to form into ligaments, and a tip wall connected to the downstream end of said ink wall and forming a tip end of said fluid passageway outlet to cause any said ink on said ink wall to break up into drops and part from said ink wall. The printing head may be incorporated in a printing system wherein said head has a plurality of ink jet nozzles disposed in a row, ink supply means connected to all of said ink jet nozzles, air supply means, a plurality of solenoid valves, means connecting one each of said solenoid valves to said air supply means and to respective ones of said ink jet nozzles to eject ink from each of said nozzles, means mounting said printing head in a print position relative to a surface of any said bulk material, means providing relative movement transverse to said nozzle row between said printing head and the bulk material surface on which printing information is delivered by said ink jet nozzles, and means to selectively control said solenoid valves to print alphanumeric characters by ink ejection and said relative movement.

An object of the invention is to provide a printing head for generating large scale alphanumeric characters directly on bulk material such as a roll of paper.

Another object of the invention is to provide label information directly on a bulk material item at a fast and legible rate.

Another object of the invention is to provide greater permanence to the label information under adverse environments than the prior systems.

Another object of the invention is to provide a bulk printing system with adaptability for computer input from an order and production data base and for computer surveillance of production rolls of paper or like items.

Another object of the invention is to provide a bulk material printing system which removes the need for adhesives.

Another object of the invention is to provide a system of printing highly legible label information on bulk items such as paper rolls to avoid the uneconomic misdirection of such paper rolls.

Other objects and a fuller understanding of the invention may be had by referring to the following description and claims taken in conjunction with the accompanying drawing.

DESCRIPTION OF THE PREFERRED EMBODIMENTS

Figure 1:
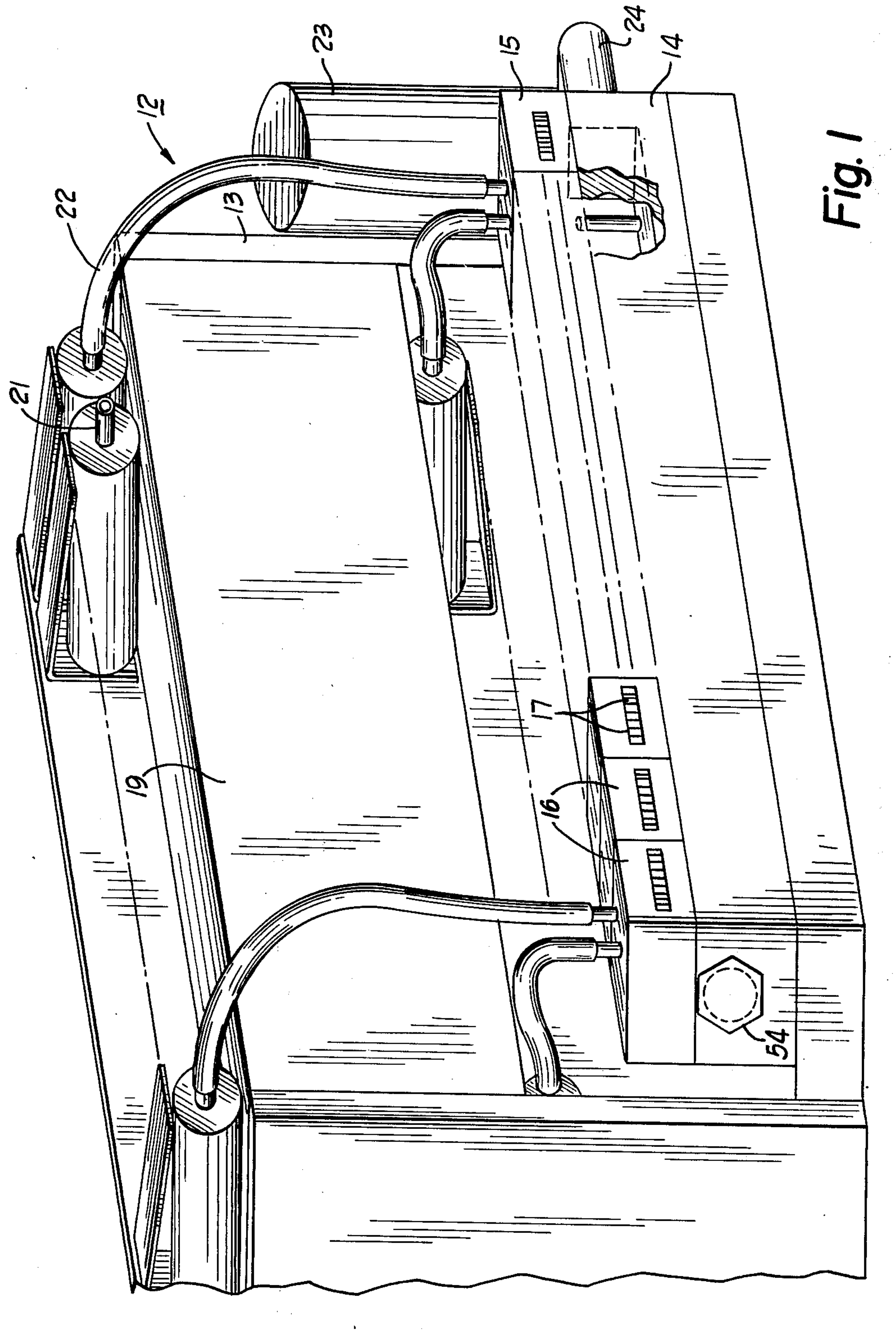
FIG. 1 is a perspective view of a print head embodying the invention.

FIG. 1 shows a print head 12 embodying the invention. This print head includes a frame 13 on which is mounted an ink reservoir 14. Above this reservoir 14 is mounted a nozzle array 15 which includes a plurality of nozzle blocks 16 with each block having a plurality of nozzle outlets 17. Ink is emitted from each of the outlets 17 onto some receiving or printing surface spaced a small distance horizontally in front of the nozzle outlets.

By way of example, there may be seven outlets 17 in a block and there may be a dozen blocks 16 in the array 15. FIG. 1 shows some of the intermediate blocks 16 in phantom for ease of illustration. If the receiving sheet of paper is moved vertically relative to the nozzle array 15, then ink emitted selectively by the nozzle outlets 17 will print label information on the sheet of paper in twelve vertical columns with seven dots per column establishing the height of the ink emitted from such nozzles.

Figure 8:
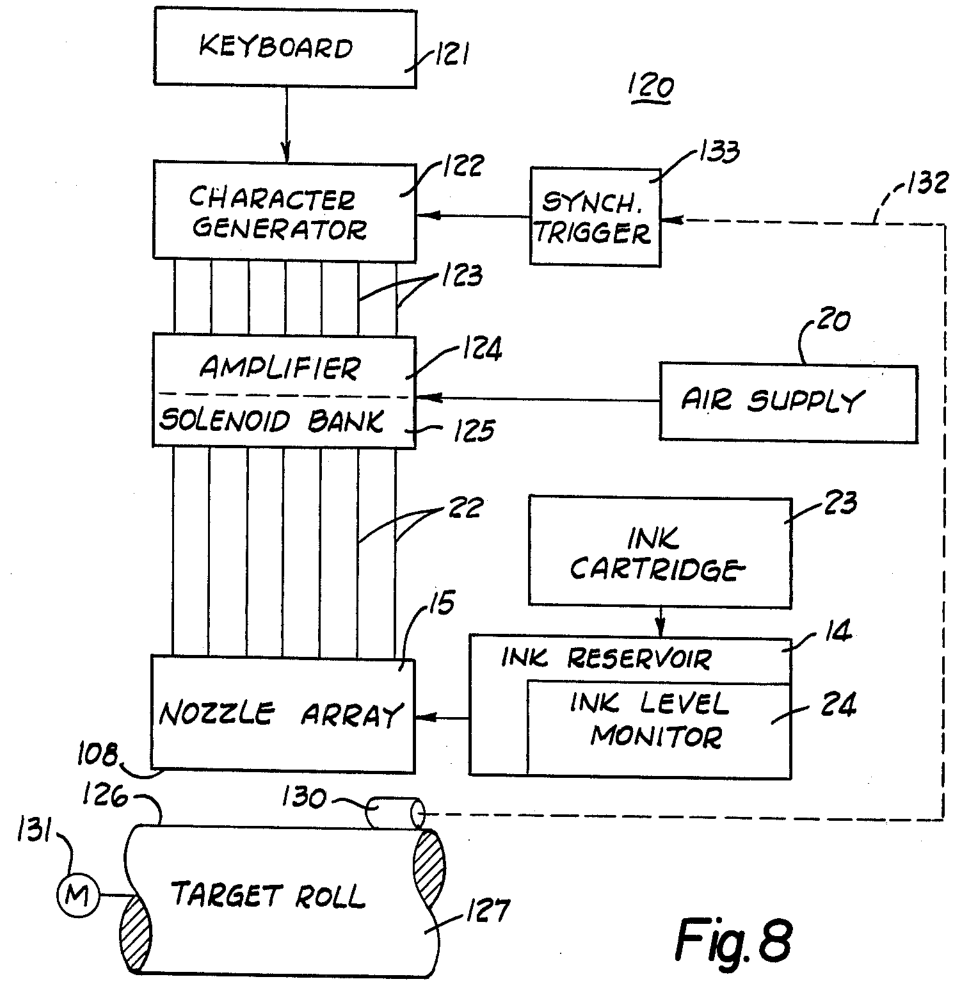
FIG. 8 is a schematic diagram of a control system for the print head of the invention.

An air plenum 19 is mounted on the frame 13 and receives air from an air supply 20 shown in FIG. 8. A plurality of solenoid valves 21 are mounted on the frame 13 and there is one solenoid valve for each of the nozzle outlets 17 and each solenoid valve is connected to selectively supply air under pressure from the air plenum 19 via hoses 22 to the individual nozzle outlets 17 in the nozzle blocks 16. Not all of the solenoid valves 21 are illustrated on FIG. 1 in order to avoid confusion in the drawing. An ink cartridge 23 supplies ink through an ink level monitor 24 to the ink reservoir 14 to maintain the level of ink therein at a desired level below the nozzle outlets 17. When air is valved by the respective solenoid valve 21 to a particular nozzle in the nozzle array 15, ink is drawn from the reservoir 14 and caused to be emitted from the respective nozzle outlet 17 so as to impinge on the receiving surface, not shown in FIG. 1, but illustrated as a roll of paper 26 in FIGS. 9 and 10. This roll of paper is an example of an item of bulk material such as pulp bales, paper board bundles or any other unitized commodity with a suitable exterior surface to receive alphanumeric characters.

Figure 3:
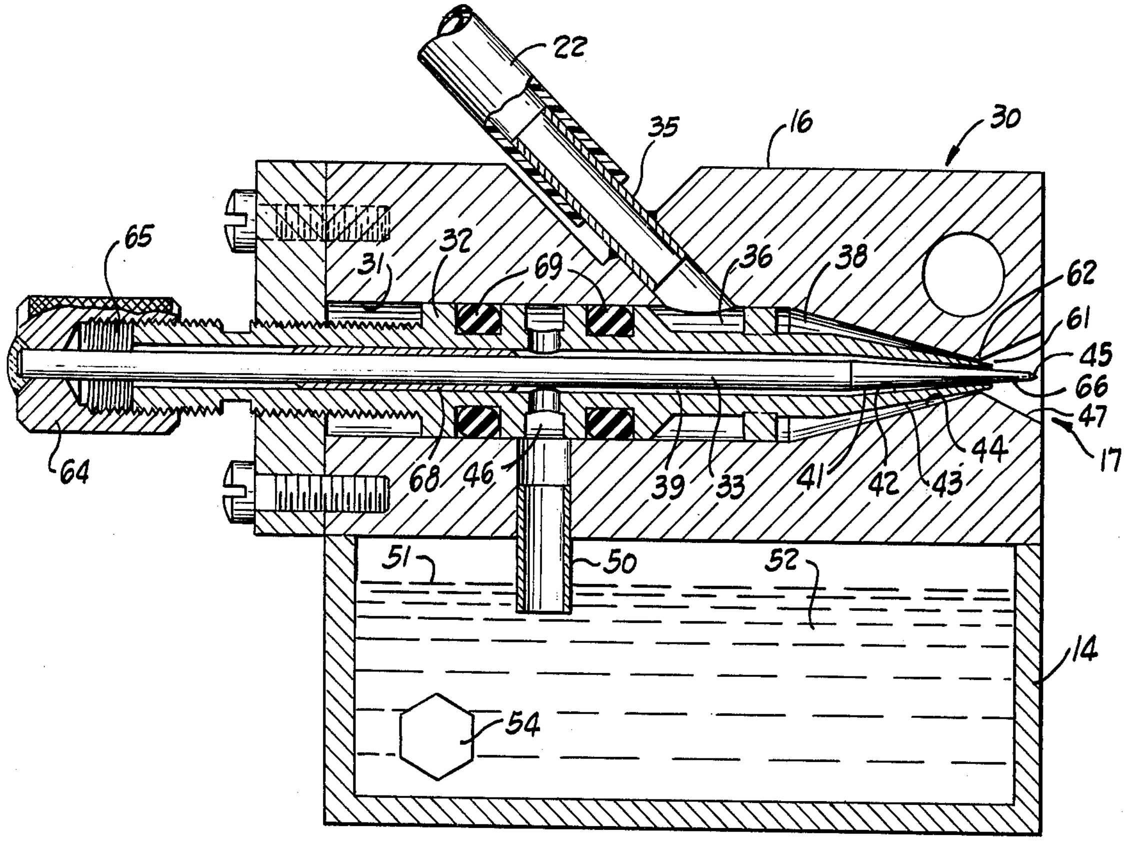
FIG. 3 is a vertical sectional view on line 3—3 of FIG. 2.
Figure 2:
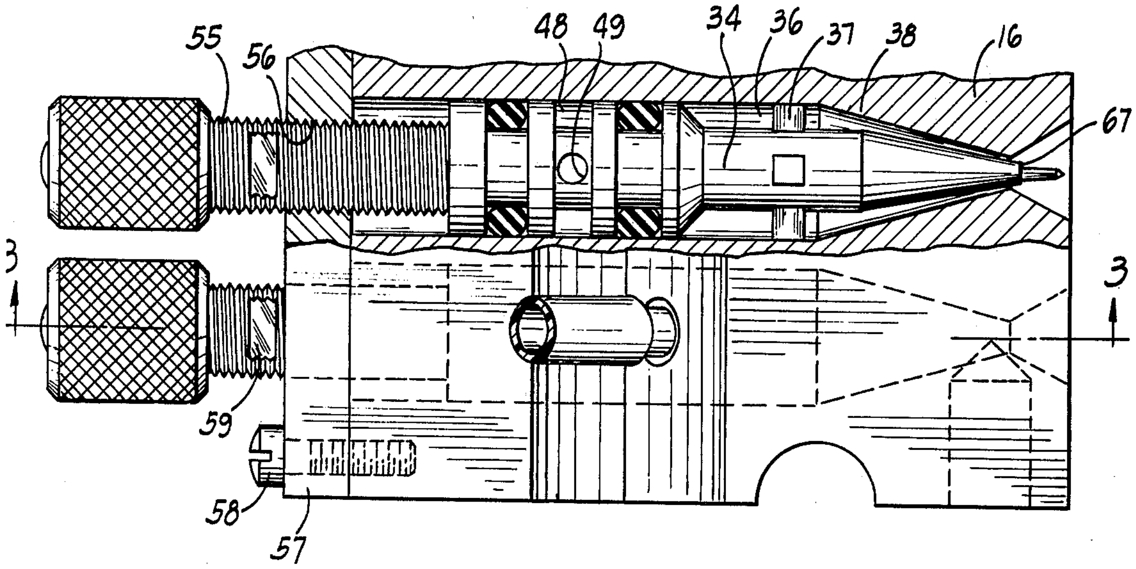
FIG. 2 is an enlarged partial plan view partly in section of one of the plural blocks of plural nozzles in the print head of FIG. 1.

FIGS. 2 and 3 are enlarged views of one form of nozzle 30 each of which has the nozzle outlet 17 with a plurality of such nozzles within each nozzle block 16. As mentioned above there may be seven such nozzles 30 within each block 16, and FIG. 2 is a partial view of such block 16 showing two such nozzles 30.

The nozzle block 16 may be made from suitable material such as stainless steel with an aperture 31 in which a barrel 32 is disposed and a needle 33 is disposed inside the barrel coaxial therewith about a central axis 34. Each of the plurality of hoses 22 is connected to a conduit 35 communicating with an annular space 36 defined by an annular cut in the barrel 32. A plurality of radial projections 37 center the barrel 32 in the aperture 31 but permit air communication from the annular space 36 to an air or fluid passageway 38. An ink passageway 39 is provided between the needle 33 and the barrel 32.

The nozzle construction is one which includes first, second, third, fourth and fifth walls 41 through 45 respectively, and in this embodiment all of these walls are circular and concentric with the central axis 34. The first wall 41 is a slightly conical taper on the exterior surface of the needle 33 near the point area or tip end of this needle, as defined by the fifth wall 45. This fifth wall is also conical and has an included angle between the conical walls as viewed in FIG. 3 which is a considerably larger angle than the included angle between the cone defining the first wall 41. The second wall 42 is also slightly conical and is on the interior surface of the barrel 32. The first and second walls 41 and 42 define the ink passageway 39 leading from an ink supply area 46 to the point area at the fifth wall 45. The third wall 43 is on the exterior surface of the barrel 32 and the fourth wall 44 is a conical extension of the aperture 31 on the interior of the nozzle block 16. The third and fourth walls 43 and 44 define the air or fluid passageway 38 leading from the fluid pressure supply area 36 to the point area at the fifth wall 45. An exterior conical wall 47 at a relatively large conical angle defines each of the nozzle outlets 17.

The ink supply area 46 is provided by an annular cut 48 in the barrel 32 and a cross drilled hole 49 provides communication between the ink supply annular area 46 and the ink passageway 39. A conduit 50 connects to the ink supply area 46 and dips into the ink reservoir 14 to be below the level 51 of the ink 52. An ink drain 54 may be used to purge ink from the system during extended shutdowns or change over to a different color ink for example.

The barrel 32 has external threads 55 received in a tapered aperture 56 in a plate 57 secured by screws 58 to the rear of each block 16. Flats 59 on the threaded area 55 are wrench pads to permit rotational adjustment of the barrel 32 and hence longitudinal adjustment of the third wall 43 relative to the fourth wall 44 at an air or fluid outlet 61 of the air passageway 38. This adjustment of the two conical walls 43 and 44 establishes an adjustable fluid venturi 62 at this outlet 61.

The needle 33 is secured to a knob 64 which is internally threaded at 65 to engage the external threads 55. This provides an axial adjustment to the needle 33 to adjust the position of an ink wall 66 which lies downstream from the outlet 67 of the ink passageway 39. In this embodiment the ink wall 66 is an extension of the first wall 41 on the needle 33. A seal 68 centers the needle 33 in the barrel 32 and interconnects the first and second walls 41 and 42 to define the ink supply area 46 at the conduit 50. O-ring seals 69 separate the ink supply and air supply areas from each other and prevent ink leakage to the rear of the barrel 32. When air is supplied through the hose 22, it is directed out of the nozzle 30 through the air venturi 62. This draws ink through the ink passageway 39 to the ink outlet 67 so that the ink flows along the ink wall 66 and is emitted as a fine mist of ink droplets from this nozzle outlet 17.

Figure 4:
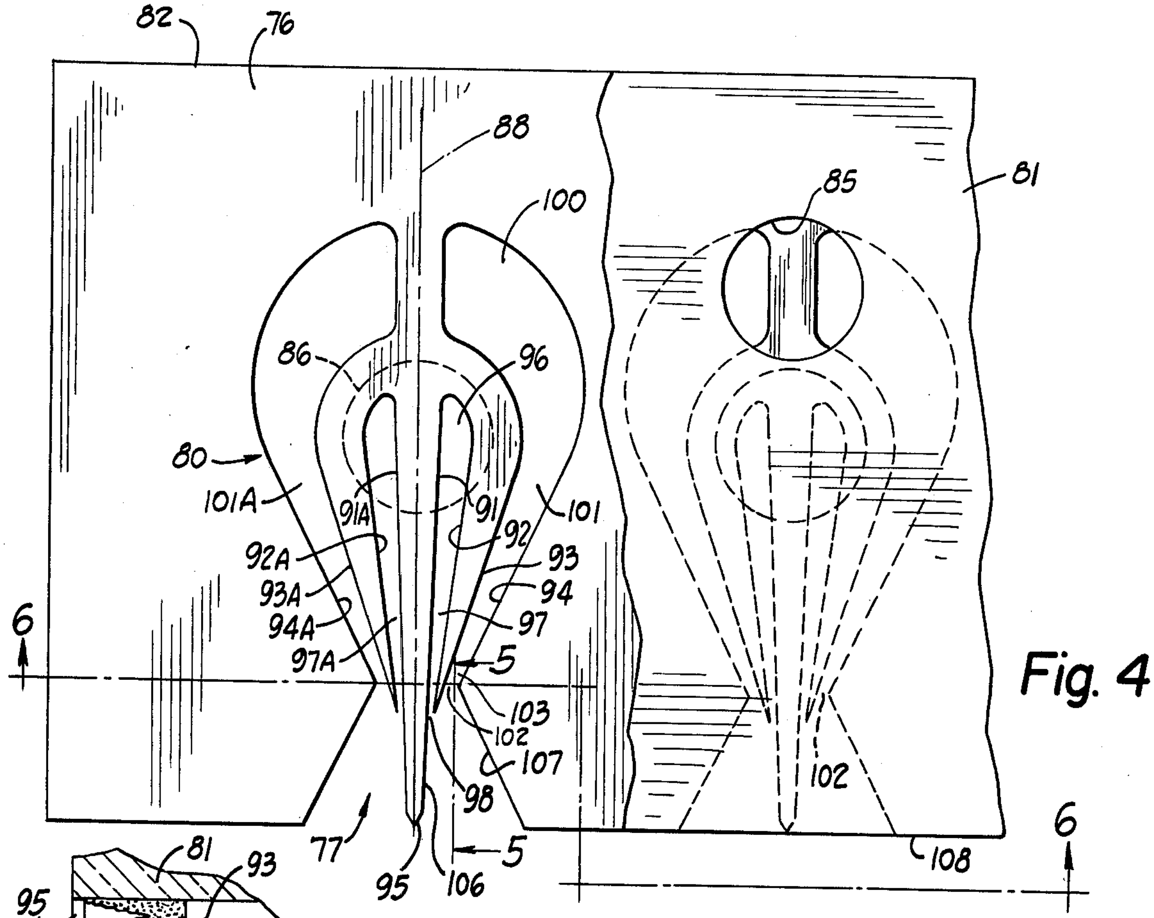
FIG. 4 is an enlarged partial plan view partly in section of a modified form of nozzle block.
Figure 5:
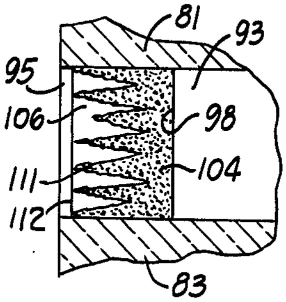
FIG. 5 is an enlarged sectional view on line 5—5 of FIG. 4.
Figure 6:
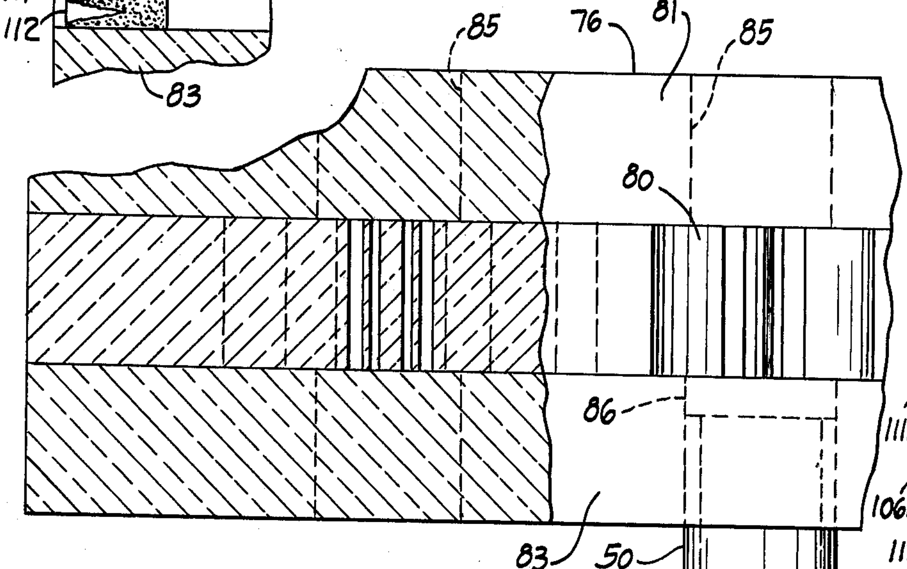
FIG. 6 is an enlarged sectional view on line 6—6 of FIG. 4.

FIGS. 4, 5, 6 and 7 show an alternative embodiment of a nozzle block 76 which may be used in the nozzle array 15. The nozzle 30 of FIGS. 2 and 3 was circular in cross section but the nozzle 80 in the nozzle block 76 is rectangular in cross section, as shown in FIG. 6. The nozzle block 76 includes a plurality of nozzles 80 disposed in a row and again as an example this may be seven such nozzles to emit seven dots upon relative movement of a sheet of paper and the nozzle array 15. Each dot is made up of a plurality of ink droplets as emitted by each of the nozzle outlets 77. The nozzle block 76 is made from a sandwich of three layers 81, 82 and 83. Each of these layers may be made by die casting, for example, or may be of insulating material and made by injection molding techniques. As shown however, these three layers are of a glass or ceramic composition with the various apertures formed by etching away parts of the material. The first layer 81 has air inlet apertures 85 which would be connected to the hoses 22 of FIG. 1. The third layer 83 is on the bottom of the sandwiched layers and all these layers are adhered together to form the composite nozzle block 76. The lower third layer 83 has ink inlet apertures 86 to receive the ink conduits 50 which dip into the ink reservoir 14, as shown in FIG. 3.

The second layer 82 is the layer which contains the plurality of nozzles 80. Each nozzle has a central axis 88 and the nozzle is symmetrical about this axis. Describing the nozzle construction first and on only one side of this axis, the second layer 82 is provided with first, second, third, fourth and fifth walls 91–95, respectively. The first and second walls 91 and 92 are joined together at an ink supply area 96 and these first and second walls together define an ink passageway 97 which walls slightly converge toward an ink outlet 98 near the nozzle outlet 77. The third and fourth walls 93 and 94 join together at an air or fluid supply area 100 and these walls form a fluid or air passageway 101 with the walls slightly converging toward an air outlet 102. An air venturi 103 is provided at this air outlet 102 and the ink outlet 98 is approximately at the throat of this air venturi 103 so that the air emitting from the air outlet 102 will draw the ink 52 from the ink outlet 98 as a film 104 of ink onto an ink wall 106 which in this modification is a continuation of the first wall 91. An exterior nozzle wall 107 extends from the air venturi 103 to the front face 108 of the nozzle block 76.

The aforementioned parts 91–107 are duplicated as parts 91A–107A on the opposite side of the central axis 88. This forms symmetrical ink passageways 97 and 97A adjacent the axis 88 and symmetrical air passageways 101 and 101A outboard of these ink passageways so as to form a symmetrical ink flow on the ink walls 106 and 106A with air flow on the outside of these ink walls at the nozzle outlet 77. The fifth wall or tip wall 95 has the mating wall 95A, and the two form the central tip end of the nozzle 80.

FIG. 5 shows a typical flow of ink with the ink 52 initially being formed as an ink film 104 after its exit from the ink outlet 98. Because the third and fourth walls 93 and 94 direct the air flow at about a 20 degree angle onto the ink wall 106, this relatively high velocity air flow acts on the ink film 104 to cause it to form into filaments or ligaments 111 as it streams toward the fifth wall or tip wall 95. Based on induced perturbations and surface tension characteristics of the ink, these ligaments become unstable and tend to break up into droplets of various sizes emerging from the nozzle as a spray mist. If the ink film 104 has not all been turned into droplets thru ligamentation process by the time the film reaches the junction 112 of the ink wall 106 and fifth wall 95, then it has been found that the ink does break up into droplets at this junction 112.

Figure 7:
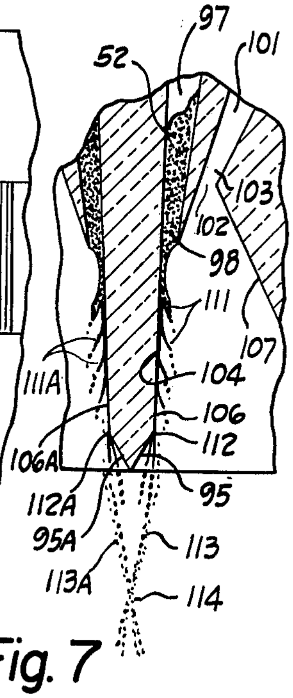
FIG. 7 is an enlarged partial view, similar to FIG. 4, showing the ink droplet flow.

FIG. 7 is an enlarged view similar to FIG. 4 and shows that the flow of the ink droplets, as they are emitted from this junction 112, is along a path 113 which lies intermediate the plane of the ink wall 106 and the plane of the fifth wall 95. This may be due to adhesion of the ink droplets to the ink wall 106 or to the action of the air stream which is outboard of the path of the ink droplets, or both. In any event the ink droplets from the other ink wall 106A part therefrom at the junction 112A and lie along a path 113A similar to path 113 and these two paths converge and cross or appear to cross at a convergence point 114 somewhat similar to a vena contracta. The distribution of the ink droplets is circular in cross section for the circular cross section nozzle 30 of FIGS. 2 and 3 and it has been observed that the distribution of the ink droplets from the nozzle 80 of FIGS. 4–7 is somewhat diamond or rhomboid shaped in cross section. This is the pattern of the ink droplets as they strike a surface of the paper on which the dots are imprinted. The air flow from the air outlet 102 is directed at a shallow angle A of about 20° onto the ink wall 106. This wall diverts the air flow to be more nearly parallel to the ink wall. Momentum transfer from the air stream to the ink film thins the film progressively in the direction of flow and shear forces induce ligamentation and ultimate atomization. The fifth or tip wall 95 defines an obtuse angle relative to the ink wall 106 so that it is disposed out of the diverted air flow by the complement to such obtuse angle. The ink droplets appear to try to follow around the junction 112 to the tip wall 95, but this junction does cause the droplets to break loose from the surface and follow the path 113.

FIG. 8 is a schematic diagram of a control circuit 120 which is used to control the print head 12 shown in FIG. 1. This control circuit includes generally a keyboard such as a typewriter keyboard 121 having an output to a character generator 122. This character generator is a commercially available item which generates the impulses necessary to create the alphanumeric characters which are to be printed by ink emitted from the print head 12. The character generator has an output on a plurality of lines 123 to an amplifier 124 which develops sufficient electrical power to energize the plurality of solenoid valves 21 in the solenoid bank 125. The air supply 20 is connected to the air plenum 19, shown in FIG. 1, so as to supply air under pressure to this bank 125 of solenoid valves. The plurality of hoses 22 is shown in FIG. 8 as leading from the bank of solenoids to the nozzle array 15. The ink is emitted from the front face 108 of the nozzle array to impinge upon a printing surface 126 of a target roll 127. In this FIG. 8 the printing surface is shown as the cylindrical periphery of this target roll 127 and a monitor roll 130 rides on this printing surface 126 to determine the speed of the printing surface relative to the nozzle array 15 which in this case is imparted by rotation of the target roll 127 by any suitable means such as a motor 131. The monitor roll is connected by a connection 132 to a synchronous trigger 133 which in turn is connected to an input of the character generator 122 to control the timing of the impulses of the various solenoids in the solenoid bank 125 in accordance with this relative speed of the nozzle 15 and printing surface 126. FIG. 8 also shows the ink cartridge 23 supplying ink to the ink reservoir 14 as controlled by the ink level monitor 24 and this ink reservoir 14 supplies ink to the nozzle array 15.

Figure 9:
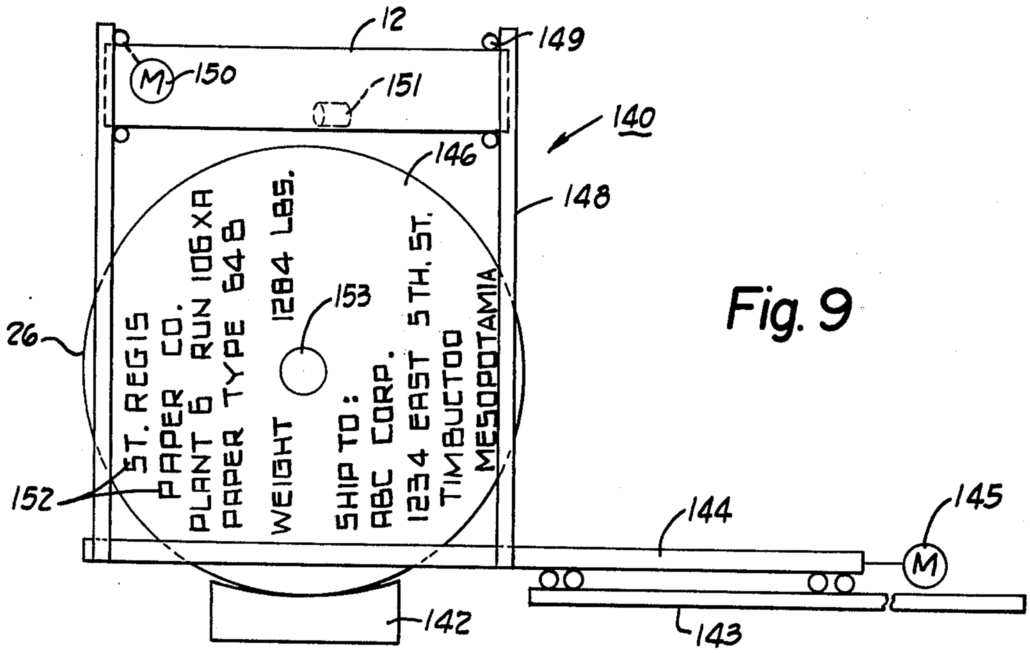
FIG. 9 is an elevational view of a bulk printing system utilizing the print head of the invention.

FIG. 9 illustrates a bulk printing system 140 wherein a bulk item, such as a paper bale, paper board bundle, or any unitized commodity, is shown as a roll of paper 26 moved by a conveyor 142. The conveyor would be stopped at a convenient point adjacent a track 143 which supports a movable carriage 144 as moved by a motor 145. This carriage 144 moves horizontally to a position adjacent the planar end of the paper roll 26 which planar end will become the printing surface 146 of this roll of paper 26.

The carriage 144 carries vertical rails 148 which support a vertically moving carriage 149 as moved by a motor 150. The print head 12 is mounted on this vertically moving carriage 149 for co-action with the printing surface 146. The print head carries a monitor roll 151 to ride on the printing surface 146 and thus determine the relative speed of the print head 12 and the printing surface 146 as the motor 150 vertically moves the carriage 149. Accordingly alphanumeric characters 152 are imprinted on the printing surface 146 during this relative movement. Such printed information may include many different types of information such as the person shipping, the manufacturer, the addressee, the type of paper, the weight, the run number, etc. Where desired the weight information may be imprinted from an automated weight scale. The keyboard 121 or any type of programmed input, i.e. card/card reader, paper or magnetic tape, disc drive on line computer, etc. may easily supply the character information. Spaces may be provided so that no characters are attempted to be imprinted on the hollow core 153 of the paper roll 26 as part of the programmed format.

Figure 10:
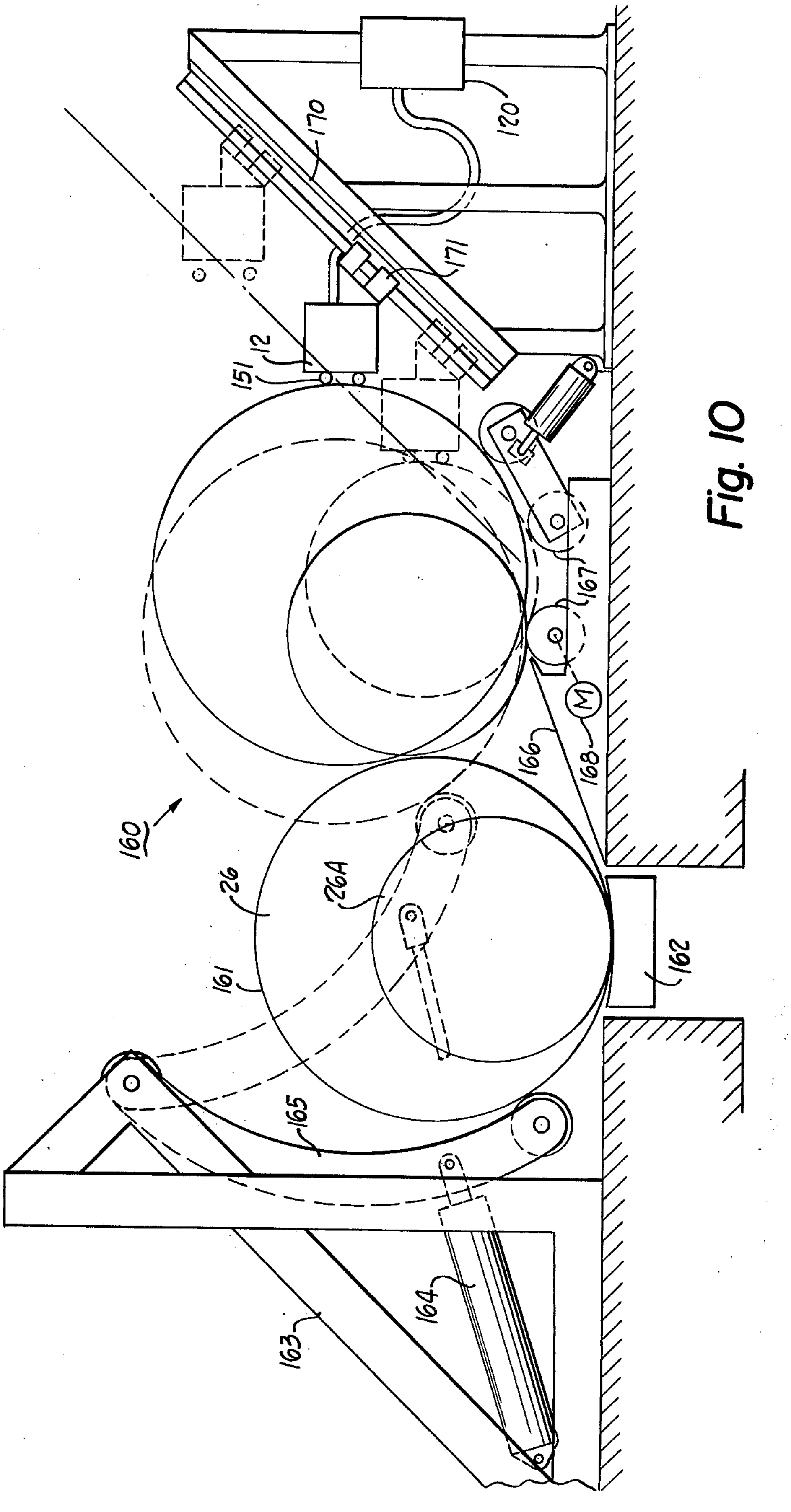
FIG. 10 is an elevational view of a modified form of bulk printing system utilizing the print head of the present invention.

FIG. 10 is a side elevational view of a modified bulk printing system 160 to imprint alphanumeric characters on the cylindrical peripheral surface or printing surface 161 of a roll of paper 26. A conveyor 162 conveys such roll of paper 26. A conveyor 162 conveys such roll of paper 26 or other bulk commodity and then stops at a position adjacent a kicker frame 163 wherein a fluid cylinder type of motor 164 actuates an arm 165 to engage the printing surface 161 and move the paper roll 26 up an incline 166 so that the roll rests on rolls 167, at least one of which is driven by a motor 168. Rolls 26 and 26A of various sizes may be accommodated on this bulk printing system 160 both by the kicker frame 163 and by the rolls 167.

Fixed rails 170 support a movable carriage 171 which moves at an angle to both the horizontal and vertical along a line at about a 46 degree angle to the horizontal. The print head 12 is mounted on the movable carriage 171 so that it may be positioned in various elevations determined by the vertical center of the roll 26 or 26A above the rolls 167. This print head 12 again carries the monitor roll 151 or 130 to determine the relative speed of the printing surface 161 and the print head 12. This relative motion in this case is determined by motor 168 which rotates the entire roll of paper 26. During this relative rotation the control circuit 120 will cause the print head to imprint on this printing surface the desired alphanumeric characters.

OPERATION

The operation of many of the parts has been described along with the description of the physical components of these assemblies. The circular cross section nozzle 30 of FIGS. 2 and 3 is an enlargement of about ten times scale of a nozzle actually constructed in accordance with the present invention. The nozzle block had seven such nozzles 30 therein with the central axes 34 thereof parallel and spaced apart approximately 0.25 inches (0.635 centimeters). In this embodiment the ink is drawn out as a film on the ink wall 66 from the ink outlet 67. The ink passageway 39 does gradually taper to a smaller cross sectional area at the ink outlet 67, however this does not act primarily as a venturi, rather it acts more like a capillary passageway supplying ink to the ink outlet 67. This outlet is substantially at the air outlet or throat of the air venturi 62 so that the slight suction from this air venturi does draw the ink out onto the ink wall 66.

The exterior conical wall 47 starts at the venturi 62 and this venturi is upstream from the ink outlet 67 primarily to keep ink off this exterior conical wall 47 to prevent spattering of the droplets forming the ink dot pattern. With this exterior conical wall 47 starting at an area upstream from the ink outlet 67, then the ink does flow substantially entirely along the ink wall 66. The needle 33 may be adjusted in axial position and the barrel 32 may also be adjusted in axial position but it has been found that the positions for best performance is about as shown in FIGS. 2 and 3. In these positions the ink forms as a film along the ink wall 66 of the needle 33. The air passageway 38 directs the air at a shallow angle A to the ink wall 66, which in this embodiment is about a ten degree angle. This relatively high velocity air transfers energy to the ink film along this needle ink wall 66 and rapidly forms it into ligaments, similar to the ligaments 111 shown in FIG. 5. This forms droplets as a fine mist emitted from the nozzle outlet 17. If any of the ink film has not ligamented and been subsequently atomized prior to reaching the junction between the ink wall 66 and the fifth wall 45, this film tends to turn into droplets at this junction, because the conical angle of the fifth wall 45 has a much greater included angle of the cone than the inclined angle of the conical ink wall 66. Again the action is similar to the path 113 and 113A of the droplets shown in FIG. 7. The small droplets are entrained and dispersed in the air stream, which first converges and then diverges beyond the tip of the nozzle. This diverging air stream prints a dot on the printing surface which normally is spaced about 0.35 inches (0.89 centimeters) from the front face of the nozzle outlet. The spacing might be in the range of 0.25 inches to 0.50 inches (0.635 to 1.27 centimeters). At the larger spacing the pattern of the drops or droplets shows more misting and spreading so that the alphanumeric characters printed are not as clear. If the spacing is too close then the individual droplets tend to smear together to wet the surface and then there may be cratering caused by generally radial flow of the ink outwardly from the center on the printing surface.

The ink droplet and air flow from the nozzle 80 of FIGS. 4–7 has previously been explained. The nozzle 80 shown in these figures is about ten times the scale of that nozzle constructed in accordance with the invention, which was provided with central axes 88 spaced apart a distance of 0.25 inches (0.635 centimeters). In this nozzle construction of FIGS. 4–7, the convergence point 114 was approximately 0.10 inches (0.254 centimeters) from the tip end of the nozzle outlet 77, and if the printing surface were spaced in front of the nozzle outlet by a distance of 0.25 inches (0.635 centimeters) then the pattern of the printed dot was diamond or rhomboid shaped. The optimum spacing between the nozzle outlet and the printing surface was approximately 0.35 inches (0.89 centimeters) for a dot of closely grouped droplets without much misting or overspraying and without the cratering effect caused by too close a spacing between the nozzle outlet and the printing surface.

The nozzle 30 of FIGS. 2 and 3 has the advantage of being able to adjust the axial position of the needle 33 and the barrel 32, yet in the nozzle 80 of FIGS. 4–7 there is the simplicity of construction for economy of manufacture. The pattern of the ink droplets upon the printing surface may be varied by a number of factors including air flow, pressure and rate, the negative head caused by the level 51 of the ink in the reservoir 14, and the viscosity and surface tension of the ink. A satisfactory ink used with either nozzle of the invention was one containing four to six percent dye and the remainder a liquid carrier which is composed of about 70 percent methanol and 30 percent glycol. Increasing the percentage of glycol relative to methanol increased the viscosity and the surface tension. An excess amount of glycol created too much overspray and spatter with large droplets impinging on the printing surface outside the desired dot pattern.

The negative head of the ink to the ink level 51 has been found to be satisfactory at a range of about 0.5 to 0.6 inches (1.27 to 1.53 centimeters). This provides quick response of the ink flow as the air is pulsed on by the solenoid valve.

The solenoid valves 21 used with the unit actually manufactured in accordance with FIGS. 4–7 were capable of rapid operation, namely, about 100 cycles of operation per second. The length of the time that air flow is permitted by an opened solenoid valve has been found as being not too critical and does not materially change the length of the dot on the printing surface. Instead the air flow needs to be present for a sufficient length of time in milliseconds for the ink to be drawn up through the conduit 50 and into the capillary ink passageway 39 or 97 and actually sucked out by the air flow to be printed onto the paper. There is a delay of approximately 0.0025 seconds after the solenoid is electrically energized before the solenoid valve opens. The hoses 22 are approximately 12 inches (30 centimeters) long which causes another delay of approximately 0.001 seconds until air and ink start being emitted from the nozzle outlet. Thus this is a total delay of about 0.0035 seconds which is sufficiently small so that 50 to 100 operating cycles per second of the solenoid valves may be achieved. There are seven nozzles in a row in a nozzle block and selectively pulsing these nozzles five times during relative movement between the print head and the printing surface will create a 5 by 7 dot matrix to print an alphanumeric character. Considering the desired space between letters of a word, one may achieve a letter and an adjacent space in a 6 by 7 dot matrix. Thus an eight letter word may be printed in one second at an operational rate of fifty cycles per second on the solenoid valves 21.

The complete nozzle array 15 shown in FIG. 1 may include a plurality such as twelve individual nozzle blocks so that the printing information as shown in FIG. 9 may be twelve lines of alphanumeric characters simultaneously being printed. As one example for roll stenciling this may include twelve lines of printing of 25 alphanumeric characters per line printed on the end surface of the paper roll 26 in approximately three seconds. This may be done by moving the print head as in FIG. 9 or in rotating the printing surface 161 with a stationary print head 12 as in FIG. 10.

It will be noted that the present invention provides a bulk printing system with many advantages. Large scale characters of a height of about 1.5 to 2.0 inches (3.8 to 5 centimeters) are applied directly on the bulk commodity such as pulp bales, paperboard bundles or rolls of paper and the like. Smaller scale characters are feasible with reduced geometrics or dimensions of these emobdiments. The label information such as destination, type, weight, addressee, addressor etc. is applied to the paper roll at a much faster rate than by alternative methods. The alphanumeric characters provide greater permanence to the label information under adverse environments. The system is adaptable for computer input from an order, production, and weight data base, and the system removes the need for any adhesives, in the case of preprinted labels, which pose problems in the labeling and converting operations. The present printing system apparatus thereby eliminates much of the misdirected paper rolls caused by illegibility of label information and it also reduces manpower requirements in the roll finishing area.

The present disclosure includes that contained in the appended claims, as well as that of the foregoing description. Although this invention has been described in its preferred form with a certain degree of particularlty, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A printing head comprising in combination,
a base,
means on said base defining a fluid passageway,
means on said base defining an ink passageway,
an outlet from said fluid passageway,
an ink wall downstream from said outlet,
means for introducing ink onto said ink wall from said ink passageway,
said fluid passageway outlet directing fluid at an angle A onto said ink wall to cause the ink on said ink wall to form into ligaments,
and a tip wall connected to the downstream end of said ink wall and forming a tip end of said fluid passageway outlet to cause any said ink on said ink wall to break up into drops and part from said ink wall.

2. A printing head as set forth in claim 1, wherein said means for introducing ink includes a venturi in said fluid passageway substantially at said outlet,
and said ink passageway having an ink outlet to the throat area of said venturi.

3. A printing head as set forth in claim 2, wherein said venturi at said fluid passageway outlet is positioned to direct fluid onto said ink wall at said angle A which is a small acute angle to first spread the ink flow as a film on said ink wall and then form the ink film into ligaments.

4. A printing head as set forth in claim 1, wherein said fluid flow is an air flow diverted by said ink wall to be more nearly parallel to said ink wall than said angle A,
and said tip wall defining a second obtuse angle relative to said ink wall disposed out of the diverted air flow.

5. A printing head as set forth in claim 4, wherein said tip wall is disposed out of said diverted air flow by the complement to said obtuse angle being greater than said angle A to thus establish ink droplets moving in a path from the junction of said ink and tip walls which path is intermediate said tip wall and the planar extension of said ink wall.

6. A printing head as set forth in claim 4, including an axis of symmetry on said base,
a second fluid passageway and a second ink passageway being disposed on said base substantially symmetrical to said first mentioned fluid and ink passageway relative to said axis of symmetry,
a mating wall being a mate to said ink wall and symmetrical thereto relative to said axis,
a second tip wall connected to the downstream end of said mating wall of said second mentioned fluid passageway,
said first mentioned and said second tip walls joining and forming said tip end, and
the drops emitted from said ink wall being directed toward said axis of symmetry and the drops emitted from said mating wall being directed toward said axis of symmetry to establish two converging flows of ink drops.

7. An ink jet printing head comprising, in combination,
a base,
a first wall on said base leading to a point area,
a second wall on said base and defining with said first wall an ink passageway, means joining together said first and second walls at an ink supply area and said ink passageway leading therefrom to an ink outlet near said point area, a third and a fourth wall on said base, means joining together said third and fourth walls at an air supply area and defining an air passageway leading therefrom toward said point area, said third and fourth walls of said air passageway converging toward said point area to define an air venturi adjacent said outlet of said ink passageway, an ink wall downstream from said air venturi, air passing through said air venturi being directed toward said ink wall to entrain ink from said ink outlet and flow the ink along the surface of said ink wall toward said point area, and a fifth wall at said point area deviating from said ink wall whereby ink is formed as ligaments along said ink wall and is broken up into small droplets substantially at said fifth wall.

8. An ink jet printing head as set forth in claim 7, wherein at least one of said walls in annular.

9. An ink jet printing head as set forth in claim 7, wherein each of said walls is annular to establish a flow of ink droplets in a pattern which is generally circular in cross section.

10. An ink jet printing head as set forth in claim 7, wherein said walls are substantially perpendicular to said base to form a three dimensional structure of rectangular cross section.

11. An ink jet printing head as set forth in claim 7, wherein each of said first, second, third, fourth, and ink walls is one of a respective pair of walls to form two ink passageways substantially symmetrically disposed on each side of a central axis and to provide two air passageways outboard of said ink passageways and substantially symmetrically disposed about said central axis.

12. An ink jet printing head as set forth in claim 11, wherein said fifth wall is one of a pair of fifth walls which converge to a blunt point at said point area, said two fifth walls having an included angle therebetween larger than the included angle between the pair of ink walls.

* * * * *

UNITED STATES PATENT AND TRADEMARK OFFICE

CERTIFICATE OF CORRECTION

PATENT NO. : 4,146,900

DATED : March 27, 1979

INVENTOR(S) : Gary A. Arnold

It is certified that error appears in the above-identified patent and that said Letters Patent are hereby corrected as shown below:

Column 11, line 21 (line 2 of claim 8), delete "in" and insert --is--.

Column 8, line 11, delete "inclined" and insert --included--.

Signed and Sealed this

***Fourteenth* Day of *August 1979***

[SEAL]

*Attest:*

LUTRELLE F. PARKER

*Attesting Officer* *Acting Commissioner of Patents and Trademarks*